United States Patent
Kurita et al.

(10) Patent No.: US 10,377,889 B2
(45) Date of Patent: Aug. 13, 2019

(54) THERMOPLASTIC ELASTOMER COMPOSITION AND PRODUCTION PROCESS FOR THE SAME

(71) Applicant: MITSUI CHEMICALS, INC., Tokyo (JP)

(72) Inventors: Hayato Kurita, Ichihara (JP); Kazuyoshi Kaneko, Chiba (JP); Masahiro Enna, Ichihara (JP); Tatsuya Enomoto, Narashino (JP); Hideki Mochizuki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/558,137

(22) PCT Filed: Mar. 23, 2016

(86) PCT No.: PCT/JP2016/059206
§ 371 (c)(1),
(2) Date: Sep. 13, 2017

(87) PCT Pub. No.: WO2016/158612
PCT Pub. Date: Oct. 6, 2016

(65) Prior Publication Data
US 2018/0072880 A1    Mar. 15, 2018

(30) Foreign Application Priority Data

Mar. 30, 2015 (JP) .................... 2015-069154

(51) Int. Cl.
| | | |
|---|---|---|
| C08J 3/24 | (2006.01) | |
| C08C 4/00 | (2006.01) | |
| C08L 23/16 | (2006.01) | |
| C08L 23/00 | (2006.01) | |
| C08L 23/08 | (2006.01) | |
| C08L 91/00 | (2006.01) | |
| C08L 23/26 | (2006.01) | |

(52) U.S. Cl.
CPC ............. C08L 23/16 (2013.01); C08J 3/24 (2013.01); C08L 23/00 (2013.01); C08L 23/08 (2013.01); C08L 91/00 (2013.01); C08C 4/00 (2013.01); C08F 2810/20 (2013.01); C08J 3/246 (2013.01); C08J 2319/00 (2013.01); C08J 2323/04 (2013.01); C08J 2323/06 (2013.01); C08J 2323/08 (2013.01); C08J 2323/10 (2013.01); C08J 2323/12 (2013.01); C08J 2323/14 (2013.01); C08J 2323/16 (2013.01); C08J 2347/00 (2013.01); C08J 2423/12 (2013.01); C08L 23/26 (2013.01); C08L 2205/025 (2013.01); C08L 2205/03 (2013.01); C08L 2205/06 (2013.01); C08L 2312/00 (2013.01)

(58) Field of Classification Search
None
See application file for complete search history.

(56) References Cited

U.S. PATENT DOCUMENTS

| | | |
|---|---|---|
| 4,873,288 A | 10/1989 | Komatsu et al. |
| 5,374,387 A | 12/1994 | Barnes et al. |
| 5,847,052 A * | 12/1998 | Hamanaka ............. B29C 47/38 525/197 |
| 6,506,842 B1 | 1/2003 | Heck et al. |
| 7,049,356 B2 | 5/2006 | Itoh et al. |
| 7,393,897 B2 | 7/2008 | Ito |
| 2001/0016620 A1 | 8/2001 | Itoh et al. |
| 2002/0055591 A1 | 5/2002 | Itoh et al. |
| 2003/0059637 A1 | 3/2003 | Imai et al. |
| 2003/0160359 A1 | 8/2003 | Ito |
| 2005/0038186 A1 | 2/2005 | Morikawa et al. |
| 2008/0182939 A1 | 7/2008 | Morikawa et al. |

FOREIGN PATENT DOCUMENTS

| | | |
|---|---|---|
| EP | 1 441 005 A1 | 7/2004 |
| EP | 1 640 415 A2 | 3/2006 |
| JP | 01-095142 | 4/1989 |
| JP | 06-240153 | 8/1994 |
| JP | 08-100090 | 4/1996 |
| JP | 09-095540 | 8/1997 |
| JP | 2002-513430 | 5/2002 |
| JP | 2002-201313 | 7/2002 |
| JP | 2003-089732 A | 3/2003 |
| JP | 2003-147133 | 5/2003 |
| JP | 08-163353 | 7/2008 |
| JP | 2008-163353 | 7/2008 |
| JP | 2009-131138 | 6/2009 |
| JP | 2009-191138 | 6/2009 |
| JP | 2009-173927 | 8/2009 |

OTHER PUBLICATIONS

International Search Report and Written Opinion PCT/JP2016/059206 dated Jun. 7, 2016. Mitsui Chemicals Inc (5 pages).
Extended European Search Report dated Dec. 14, 2018 in corresponding application No. 16772493.9.

* cited by examiner

*Primary Examiner* — Richard A Huhn
(74) *Attorney, Agent, or Firm* — Foley & Lardner LLP

(57) ABSTRACT

A thermoplastic elastomer composition obtained by dynamically crosslinking an ethylene/α-olefin/non-conjugated polymer copolymer (A), a polyolefin resin (B), a softener (C) in an amount of 1 to 200 parts by mass per 100 parts by mass of the total of the copolymer (A) and the resin (B), and a crosslinking agent (D) by the use of a batch mixer under the conditions satisfying the requirements (1) to (4).

4 Claims, No Drawings

THERMOPLASTIC ELASTOMER COMPOSITION AND PRODUCTION PROCESS FOR THE SAME

CROSS-REFERENCE TO RELATED APPLICATIONS

This application claims priority under 35 U.S.C. § 371 to International Patent Application No. PCT/JP2016/059206, filed Mar. 23, 2016, which claims priority to Japanese Patent Application No. 2015/069154, filed Mar. 30, 2015, the entire contents of each of which is incorporated herein by reference.

TECHNICAL FIELD

The present invention relates to a thermoplastic elastomer composition and a production process for the same. More particularly, the present invention relates to a thermoplastic elastomer composition capable of efficiently producing a molded product having excellent mechanical properties such as rubber elasticity and excellent appearance, and a production process for the composition.

BACKGROUND ART

A thermoplastic elastomer composition obtained by dynamically heat-treating a rubber and a polyolefin-based resin in the presence of a crosslinking agent generally has a structure wherein the rubber component constitutes a soft segment. (soft phase) which imparts flexibility, the polyolefin-based resin constitutes a hard segment. (hard phase) which provides a pseudo crosslinked structure, and the phase composed of the soft segment (referred to as an "island phase" hereinafter) is dispersed in the phase composed of the hard segment (referred to as a "sea phase" hereinafter). Since the thermoplastic elastomer composition has such a structure, it can exhibit excellent mechanical properties such as rubber elasticity and tensile strength.

The thermoplastic elastomer composition is produced mainly by the use of a twin-screw extruder. However, when the twin-screw extruder is used, dispersing of the island phase is not necessarily sufficient, and therefore, a composition having excellent mechanical properties and appearance has not been obtained in many cases. For example, in patent literatures 1 to 4, a production process for a thermoplastic elastomer composition using a twin-screw extruder is disclosed. In the resulting thermoplastic elastomer composition, however, dispersibility of the island phase is not necessarily satisfactory, and development of a production process for a thermoplastic elastomer composition in which further improvement in dispersibility of the island phase is realized and which can produce a molded product having more excellent mechanical properties and appearance has been desired. A molded product is usually produced by extrusion molding, and from the viewpoint of production efficiency, higher extruder output is being desired.

CITATION LIST

Patent Literature

Patent literature 1: Japanese Patent Laid-Open Publication No. 2009-191138
Patent literature 2: Japanese Patent Laid-Open Publication No. 2009-173927
Patent literature 3: Japanese Patent Laid-Open Publication No. 2003-147133
Patent literature 4: Japanese Patent Laid-Open Publication No. 2002-201313

SUMMARY OF INVENTION

Technical Problem

It is an object of the present invention to provide a thermoplastic composition capable of efficiently producing a molded product having excellent mechanical properties such as rubber elasticity and excellent appearance, and a production process for a thermoplastic elastomer composition, by which such a thermoplastic elastomer composition as above can be obtained.

Solution to Problem

The present inventor has found that the above problem can be solved by kneading the components under the specific conditions using a batch mixer, and has completed the thermoplastic elastomer composition of the present invention and a production process for the composition.

That is to say, the thermoplastic elastomer composition of the present invention is obtained by dynamically crosslinking an ethylene/α-olefin/non-conjugated polyene copolymer (A), a polyolefin resin (B), a softener (C) in an amount of 1 to 200 parts by mass per 100 parts by mass of the total of the copolymer (A) and the resin (B), and a crosslinking agent (D), by the use of a batch mixer under the conditions satisfying the following requirements (1) to (4):

$$50 \leq P1 \leq 300 \quad (1)$$

wherein P1 is defined by the following formula (i):

[Math. 1]

$$P1 = \gamma\text{ave.} \times \text{Log}(t1) \quad (i)$$

wherein the residence time (sec) after the introduction of the crosslinking agent (D) is denoted as t1 sec, and the average rate ($\sec^{-1}$) of shear rates γ in the t1 is denoted as γave. $\sec^{-1}$, $$900 \leq P2 \leq 1450 \quad (2)$$

wherein P2 is defined by the following formula (ii):

[Math. 2]

$$P2 = (T\text{ave.} + 273) \times \text{Log}(t1) \quad (ii)$$

wherein the average resin temperature (° C.) after the introduction of the crosslinking agent (D) is denoted as Tave. ° C., and the residence time (sec) after the introduction of the crosslinking agent (D) is denoted as t1 sec, $$-2.5 \leq P3 \leq 1.5 \quad (3)$$

wherein P3 is defined by the following formula (iii):

[Math. 3]

$$P3 = \text{Log}(t1/t2) \quad (iii)$$

wherein the residence time (sec) after the introduction of the crosslinking agent (D) is denoted as t1 sec, and the time (sec) required for the residual amount of the crosslinking agent (D) to become not more than 1 ppm of the introduction amount thereof at the average resin temperature Tave. after the introduction of the crosslinking agent (D) is denoted as t2 sec, and (4) the crosslinking agent (D) is introduced into the batch mixer after the ethylene/α-olefin/non-conjugated polyene copolymer (A), the polyolefin resin (B) and the softener (C) have been introduced.

In the thermoplastic elastomer composition, it is preferable that the ethylene/α-olefin/non-conjugated polyene copolymer (A) and the polyolefin resin (B) are contained in a mass ratio ((A)/(B)) of 90/10 to 10/90.

In thermoplastic elastomer composition, it is preferable that the crosslinking agent (D) is an organic peroxide and the amount of the crosslinking agent. (D) compounded is 0.01 to 3.0 parts by mass per 100 parts by mass of the total of the copolymer (A) and the resin (B).

In the thermoplastic elastomer composition, it is preferable that the batch mixer is an intermeshing mixer.

The production process for a thermoplastic elastomer composition according to the present invention comprises dynamically crosslinking an ethylene/α-olefin/non-conjugated polyene copolymer (A), a polyolefin resin (B), a softener (C) in an amount of 1 to 200 parts by mass per 100 parts by mass of the total of the copolymer and the resin (B), and a crosslinking agent (D), by the use of a batch mixer under the conditions satisfying the following requirements (1) to (4):

$$50 \leq P1 \leq 300 \quad (1)$$

wherein P1 is defined by the following formula (i):

[Math. 1]

$$P1 = \gamma ave. \times Log(t1) \quad (i)$$

wherein the residence time (sec) after the introduction of the crosslinking agent (D) is denoted as t1 sec, and the average rate (sec$^{-1}$) of shear rates γ in the t1 is denoted as γave. sec$^{-1}$, $$900 \leq P2 \leq 1450 \quad (2)$$

wherein P2 is defined by the following formula (ii):

[Math. 2]

$$P2 = (Tave. + 273) \times Log(t1) \quad (ii)$$

wherein the average resin temperature (° C.) after the introduction of the crosslinking agent (D) is denoted as Tave. ° C., and the residence time (sec) after the introduction of the crosslinking agent (D) is denoted as t1 sec $$-2.5 \leq P3 \leq 1.5 \quad (3)$$

wherein P3 is defined by the following formula (iii):

[Math. 3]

$$P3 = Log(t1/t2) \quad (iii)$$

wherein the residence time (sec) after the introduction of the crosslinking agent (D) is denoted as t1 sec, and the time (sec) required for the residual amount of the crosslinking agent (D) to become not more than 1 ppm of the introduction amount thereof at the average resin temperature Tave. after the introduction of the crosslinking agent (D) is denoted as t2 sec, and (4) the crosslinking agent (D) is introduced into the batch mixer after the ethylene/α-olefin/non-conjugated polyene copolymer (A), the polyolefin resin (B) and the softener (C) have been introduced.

In the production process for a thermoplastic elastomer composition, it is preferable that the ethylene/α-olefin/non-conjugated polyene copolymer (A) and the resin (B) are contained in a mass ratio ((A)/(B)) of 90/10 to 10/90.

In the production process for a thermoplastic elastomer composition, it is preferable that the crosslinking agent (D) is an organic peroxide and the amount of the crosslinking agent (D) compounded is 0.01 to 3.0 parts by mass per 100 parts by mass of the total of the copolymer (A) and the resin (B).

In the production process for a thermoplastic elastomer composition, it is preferable that the batch mixer is an intermeshing mixer.

Advantageous Effects of Invention

According to the thermoplastic elastomer composition of the present invention, a molded product having excellent mechanical properties such as rubber elasticity and excellent appearance can be produced, and moreover, melt density and extruder output can be enhanced, so that improvement in productivity can be accomplished. The production process for a thermoplastic elastomer composition according to the present invention can efficiently produce the above-mentioned thermoplastic elastomer composition.

DESCRIPTION OF EMBODIMENTS

<Thermoplastic Elastomer Composition>

The thermoplastic elastomer composition of the present invention is obtained by dynamically crosslinking an ethylene/α-olefin/non-conjugated polyene copolymer (A), a polyolefin resin (B), a softener (C) in an amount of 1 to 200 parts by mass per 100 parts by mass of the total of the copolymer and the resin (B), and a crosslinking agent (D), by the use of a batch mixer under the conditions satisfying the following requirements (1) to (4).

The batch mixer is not specifically restricted, and it may be a mixer of any form as far as it is a batch type. Of such mixers, a batch mixer having intermeshing rotors is preferable.

The intermeshing rotors are rotors having a structure wherein biaxial rotors intermesh with each other and carry out kneading not only between a rotor and a chamber wall surface but also between a rotor and a rotor, and they have characteristics that the rotor clearance is small and strong shearing is possible. The mixer having intermeshing rotors is generally called an intermeshing mixer.

When a batch mixer having intermeshing rotors is used, it becomes possible to sufficiently carry out dispersing of an island phase while controlling kneading and dynamic crosslinking, and moreover, formation of a gel-like substance is inhibited, whereby production of a thermoplastic elastomer composition having better appearance and having more excellent mechanical properties is realized.

The batch mixer having intermeshing rotors is preferably an internal kneading device.

Such a batch internal kneading device having intermeshing rotors is, for example, an intermeshing mixer manufactured by Harburg-Freudenberger Maschinenbau GmbH.

The requirements (1) to (4) will be described hereinafter.
Requirement (1) 50≤P1≤300
Here, P1 is defined by the following formula (i).

[Math. 4]

$$P1 = \gamma_{ave.} \times \text{Log}(t1) \quad \text{(i)}$$

In the formula (i), the residence time (sec) after the introduction of the crosslinking agent (D) is denoted as t1 sec. That is to say, the tame) for which the above components are being kneaded in a batch mixer, said time being measured from the time when the crosslinking agent (D) has been introduced into the batch mixer, is t1 sec.

In the formula (i), the average rate (sec$^{-1}$) of shear rates γ in the t1 is denoted as γave. sec$^{-1}$. That is to say, the average shear rate (sec$^{-1}$) in the time for which the above components are being kneaded in a batch mixer, said time being measured from the time when the crosslinking agent (D) has been introduced into the batch mixer, is γave. sec$^{-1}$.

The shear rate γ is determined by the following formula (iv).

[Math. 5]

$$\gamma = \pi \times D \times N / h \quad \text{(iv)}$$

In the formula (iv), D denotes a mean outside diameter (mm) of the rotor, N denotes a rotational speed (rps) of the rotor, and h denotes a tip clearance (mm).

If P1 is smaller than 50, the dispersed state of the island phase is bad because of insufficient kneading, and the appearance of a molded product is deteriorated. If P1 is larger than 300, lowering of mechanical properties and deterioration of hue of the thermoplastic elastomer composition take place because of deterioration of the resin.

In the thermoplastic elastomer composition of the present invention, it is more preferable that a requirement of 60≤P1≤275 is satisfied, and it is still more preferable that a requirement of 70≤P1≤250 is satisfied.

Requirement (2) 900≤P2≤1450
Here, P2 is defined by the following formula. (ii).

[Math. 6]

$$P2 = (T_{ave.} + 273) \times \text{Log}(t1) \quad \text{(ii)}$$

In the formula (ii), t1 has the same meaning as that of t1 in the formula (i).

In the formula (ii), the average resin temperature (° C.) after the introduction of the crosslinking agent (D) is denoted as Tave. ° C. That is to say, the average value of the resin temperatures (C) in the t1 is Tave. ° C.

If P2 is smaller than 900, the dispersed state of the island phase is bad because of insufficient kneading, and the appearance of a molded product is deteriorated. Moreover, the progress of the crosslinking reaction becomes insufficient, and the rubber elasticity of the thermoplastic elastomer composition is deteriorated. If 92 is larger than 1450, lowering of mechanical properties and deterioration of hue of the thermoplastic elastomer composition take place because of deterioration of the resin.

In the thermoplastic elastomer composition of the present invention, it is more preferable that a requirement of 950≤P2≤1400 is satisfied, and it is still more preferable that a requirement of is satisfied.

Requirement (3) −2.5≤P3≤1.5
Here, P3 is defined by the following formula (iii).

[Math. 1]

$$P3 = \text{Log}(t1/t2) \quad \text{(iii)}$$

In the formula (iii), t1 has the same meaning as that of t1 in the formula (i).

In the formula (iii), the time (sec) required for the residual amount of the crosslinking agent (ID) to become not more than 1 ppm of the introduction amount thereof at the average resin temperature Tave. after the introduction of the crosslinking agent (D) is denoted as t2 sec. That, is to say, when the introduction amount of the crosslinking agent (D) is denoted as $V_0$ and the residual amount of the crosslinking agent (D) given when t2 has passed at the average resin temperature Tave. is denoted as $V_{t2}$, a relationship of $V_{t2}/V_0 = 1/1000000$ is established. When the crosslinking agent (D) is an organic peroxide, t2 can be readily determined by calculation from the half-life of the crosslinking agent (D) and the data of activation energy.

The residual amount of the crosslinking agent is determined by the following formula (v).

[Math. 8]

$$\text{Residual amount of crosslinking agent (\%)} = \exp(-kd \times t2/3600) \times 100 \quad \text{(v)}$$

In the formula (v) kd denotes a rate constant and is obtained by the following formula (vi).

[Math. 9]

$$kd = A \exp(-\Delta E/RT) \quad \text{(vi)}$$

In the formula (vi), A denotes a frequency factor (hr$^{-1}$) is a numerical value inherent in the crosslinking agent. LE denotes as activation energy (J/mol) ΔE is a numerical value inherent in the crosslinking agent. R denotes a gas constant (8.314 J/mol·K), and T denotes an absolute temperature (° K.).

If P3 is smaller than −2.5, the progress of the crosslinking reaction becomes insufficient, and the rubber elasticity of the thermoplastic elastomer composition is deteriorated. If P3 is larger than 1.5, lowering of mechanical properties and deterioration of hue of the thermoplastic elastomer composition take place because of deterioration of the resin.

In the thermoplastic elastomer composition of the present invention, it is more preferable that a requirement of −2.2≤P3≤1.2 is satisfied, and it is still more preferable that a requirement of −2.0≤P3≤1.0 is satisfied.

Requirement (4) the Crosslinking Agent (D) is Introduced into the Batch Mixer after the Ethylene/α-Olefin/Non-Conjugated Polyene Copolymer (A), the Polyolefin Resin (B) and the Softener (C) have been Introduced That is to say, prior to the introduction of the crosslinking agent (D), the softener (C) has been introduced, and the softener (C) has been kneaded with the ethylene/α-olefin/non-conjugated polyene copolymer (A) and the polyolefin resin (B). Thereafter, the crosslinking agent (D) is introduced, and dynamic crosslinking is carried out By satisfying the requirement (4), it becomes possible to sufficiently disperse the island phase.

Although the interval between the introduction of the ethylene/α-olefin/non-conjugated polyene copolymer (A), the polyolefin resin (B) and the softener (C) and the introduction of the crosslinking agent (D) is not specifically restricted, it is preferable to introduce the crosslinking agent (D) promptly after the introduction of the softener (C). That is to say, it is preferable that the crosslinking agent (C) is introduced while the temperature of the kneadate in the batch mixer is low after the temperature thereof is lowered by the introduction of softener (C). Specifically, kneading of the ethylene/α-olefin/non-conjugated polyene copolymer (A) and the polyolefin resin (B) is carried out at about 175°

C. in the batch mixer, and when the temperature of the kneadate is lowered to not higher than 160° C., preferably not higher than 150° C., more preferably not higher than 140° C., by the introduction of the softener (C), the crosslinking agent (D) is introduced.

The components contained in the thermoplastic elastomer composition of the present invention will be described hereinafter.

In the thermoplastic elastomer composition of the present invention, the ethylene/α-olefin/non-conjugated polyene copolymer (A) forms an island phase.

As the ethylene/α-olefin/non-conjugated polyene copolymer (A), any of well-known various olefin-based copolymer rubbers can be used. Here, the ethylene/α-olefin/non-conjugated polyene copolymer rubber is preferably an amorphous random elastomeric copolymer composed of ethylene, an α-olefin of 3 to 20 carbon atoms and a non-conjugated polyene, and is preferably an olefin-based copolymer rubber which is decreased in fluidity or loses fluidity when it is mixed with a peroxide, kneaded under heating and thereby crosslinked.

Such an olefin-based copolymer rubber is specifically, for example, an ethylene/α-olefin/non-conjugated diene copolymer rubber (ethylene/α-olefin (ratio by mol):about 90/10 to 50/50).

Specific examples of the non-conjugated dienes include non-conjugated dienes, such as dicyclopentadiene, 1,4-hexadiene, cyclooctadiene, methylene norbornene and ethylidene norbornene. Of such copolymer rubbers, preferable are ethylene/propylene/non-conjugated diene copolymer rubbers and ethylene/1-butene/non-conjugated diene copolymer rubbers, and more preferable are ethylene/propylene/non-conjugated diene copolymer rubbers. Of these, an ethylene/propylene/ethylidene norbornene copolymer rubber is particularly preferable.

Specific examples of the non-conjugated polyenes other than the non-conjugated dienes include non-conjugated trienes, such as 6,10-dimethyl-1,5,9-undecatriene, 5,9-dimethyl-1,4,8-decatriene, 6,9-dimethyl-1,4,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecadiene.

The Mooney viscosity ($ML_{1+4}$(100° C.)) of the ethylene/α-olefin/non-conjugated polyene copolymer (A) is preferably in the range of 10 to 250, particularly preferably in the range of 50 to 200.

The iodine value of the ethylene/α-olefin/non-conjugated polyene copolymer (A) is preferably not more than 25. When the iodine value of the ethylene/α-olefin/non-conjugated polyene copolymer (A) is in such a range, a thermoplastic elastomer composition having been part ally crosslinked with a good balance is obtained.

The ethylene/α-olefin/non-conjugated polyene copolymer (A) and a rubber other than the ethylene/α-olefin/non-conjugated polyene copolymer (A) can be also used in combination. Examples of such rubbers other than the ethylene/α-olefin/non-conjugated polyene copolymer (A) include diene-based rubbers, such as styrene-butadiene rubber (SBR) nitrile rubber (NBR) and natural rubber (NR) and silicon rubber.

The polyolefin resin (B) forms a sea phase in the thermoplastic elastomer composition of the present invention.

As the polyolefin resin (B), a polyolefin resin synthesized from monomers containing an α-olefin as a main component is preferably used. As the α-olefin, an α-olefin of 3 or more carbon atoms is preferable, and the same α-olefin as the α-olefin shown in the copolymer rubber (A) is more preferable. Above all, an α-olefin of 3 to 12 carbon atoms is still more preferable. When the total amount of structural units of the polyolefin resin (B) is 100% by mol, the structural units derived from the α-olefin are contained preferably in amounts of not less than 80% by mol, more preferably not less than 90% by mol. The polyolefin resin (B) may be a homopolymer of an α-olefin, or may be a copolymer of two or more α-olefins, or may be a copolymer of an α-olefin and a monomer which is not an α-olefin. Further, the polyolefin resin may be a mixture of two or more different kinds of these polymers, or may be a mixture of two or more different kinds of these copolymers, or may be a mixture of such a polymer and such a copolymer. As the polyolefin resin (B), a commercial product may be used, or the polyolefin resin (B) may be produced by a well-known process using a Ziegler-Natta catalyst or a metallocene catalyst.

The maximum peak temperature of the polyolefin resin (B) determined by differential scanning calorimetry, that is, melting point. (also referred to as "Tm" simply hereinafter) is preferably not lower than 100° C., more preferably not lower than 120° C. If Tm is lower than 100° C., sufficient heat resistance and strength are not exhibited in some cases. The melt flow rate (at a temperature of 230° C. under a load of 2.16 kg) (referred to as "MFR" simply hereinafter) is preferably 0.1 to 100 g/10 min, more preferably 0.5 to 80 g/10 min. If MFR is less than 0.1 g/10 min, kneading processability and extrusion processability of the elastomer composition sometimes become insufficient. On the other hand, if MFR exceeds 100 g/10 min, strength is sometimes lowered.

The thermoplastic elastomer composition of the present invention contains the ethylene/α-olefin/non-conjugated polyene copolymer (A) and the polyolefin resin (B) preferably in a (A)/(B) mass ratio of 90/10 to 10/90, more preferably 85/15 to 30/70, still more preferably 80/20 to 40/60. When the mass ratio is in the above range, the balance between rubber elasticity and mechanical properties tends to become good.

The softener (C) can be used in two embodiments of an embodiment (c1) which is a softener having been dispersed in advance in the ethylene/α-olefin/non-conjugated polyene copolymer (A) and an embodiment (c2) which is a softener used together with the polyolefin resin (B).

As the softener (C) for use in the present invention, a softener usually used for rubbers can be used in any of the above embodiments (c1) and (c2). Specific examples of such softeners include petroleum-based substances, such as process oil, lubricating oil, paraffin, liquid paraffin, petroleum asphalt and vaseline; coal tars, such as coal tar and coal tar pitch; fatty oils, such as castor oil, linseed oil, rapeseed oil, soybean oil and coconut oil; waxes, such as tall oil, beeswax, carnauba wax and lanoline; fatty acids or metal salts thereof, such as ricinolic acid, palmitic acid, stearic acid, barium stearate and calcium stearate; synthetic polymer materials, such as petroleum resin, coumarone-indene resin and atactic polypropylene; ester-based plasticizers, such as dioctyl phthalate, dioctyl adipate and dioctyl sebacate; and other substances, such as microcrystalline wax, factice, liquid polybutadiene, modified liquid polybutadiene and liquid Thiokol. Of these, preferable are process oil, lubricating oil, paraffin, liquid paraffin, petroleum asphalt, vaseline, etc. from the viewpoint of affinity for the ethylene/α-olefin/non-conjugated polyene copolymer rubber.

The amount of the softener (C) (total amount of the softener used in the embodiment (c1) and the softener used in the embodiment (c2)) is 1 to 200 parts by mass, preferably 30 to 100 parts by mass, based on 100 parts by mass of the total of the ethylene/α-olefin/non-conjugated polyene copolymer (A) and the polyolefin resin (B). When the softener is used in such an amount as above, fluidity of the thermoplastic elastomer composition can be sufficiently improved without lowering sealing properties of a molded product. As the softener, only a softener in the embodiment (c2) may be used, or only a softener in the embodiment (c1) may be used, or both of a softener in the embodiment (C1) and a softener in the embodiment (c2) may be used.

Examples of the crosslinking agents (D) include an organic peroxide, sulfur, a sulfur compound, and a phenol-base vulcanizing agent such as phenolic resin. Of these, an organic peroxide is preferable.

Specific examples of the organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)-3-hexyne, 1,3-bis (tert-butylperoxyisopropyl) benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butylperbenzoate, tert-butylperoxyisopropyl carbonate, diacetyl peroxide, lauroyl peroxide and tert-butyl cumyl peroxide.

Of these, 2,5-dimethyl-2,5-di-(tert-butylperoxy)hexane, 2,5-dimethyl-2,5-di-(tert-butylperoxy)-3-hexyne, 1,3-bis (tert-butylperoxyisopropyl)benzene, 1,1-bis(tert-butylperoxy)-3,3,5-trimethylcyclohexane and n-butyl-4,4-bis (tert-butylperoxy) valerate are preferable from the viewpoints of odor properties and scorch stability, and of these, 1,3-bis (tert-butylperoxyisopropyl) benzene is most preferable.

For the purpose of increasing the degree of crosslinking of the ethylene/α-olefin/non-conjugated polyene copolymer (A), the crosslinking agent (D) is used preferably in an amount of 0.01 to 3.0 parts by mass, more preferably 0.03 to 2.0 parts by mass, still more preferably 0.05 to 1.5 parts by mass, based on 100 parts by mass of the total amount of the ethylene/α-olefin/non-conjugated polyene copolymer (A) and the polyolefin resin (B).

The thermoplastic elastomer composition of the present invention may contain a crosslinking assistant (E).

Specific examples of the crosslinking assistants (F) include assistants for peroxy crosslinking, such as sulfur, p-quinonedioxime, p,p'-dibenzoyl quinonedioxime, N-methyl-N,4-dinitrosoaniline, nitrosobenzene, diphenylguanidine, bismaleimide and trimethylolpropane-N,N'-m-phenylenedimaleimide; polyfunctional methacrylate monomers, such as divinylbenzene, triallyl cyanurate, ethylene glycol dimethacrylate, diethylene glycol dimethacrylate, polyethylene glycol dimethacrylate, trimethylolpropane tremethacrylate and ally methacrylate; and polyfunctional vinyl monomers, such as vinyl butyrate and vinyl stearate.

By using such crosslinking assistants, homogeneous and mild crosslinking reaction can be expected. Of these crosslinking assistants, preferable are triallyl cyanurate, ethylene glycol dimethacrylate, divinylbenzene and bismaleimide. These are easy to handle and have good compatibility with the ethylene/α-olefin/non-conjugated polyene copolymer (A) and the polyolefin resin (B) which are main components of the crosslinking treatment object. Moreover, these crosslinking assistants have an action to solubilize the organic peroxide and function as dispersing agents for the organic peroxide, so that the crosslinking effect due to heat treatment is homogeneous, and an olefin-based thermoplastic elastomer composition having a good balance between fluidity and other properties is obtained.

For the purpose of increasing the degree of crosslinking of the ethylene/α-olefin/non-conjugated polyene copolymer (A), the crosslinking assistant (B) is used preferably in an amount of 0.1 to 3.0 parts by mass based on 100 parts by mass of the total amount. of the ethylene/α-olefin/non-conjugated polyene copolymer (A) and the polyolefin resin (B). When the amount of the crosslinking assistant (F) compounded is in the above range, the crosslinking assistant does not remain in the resulting thermoplastic elastomer composition as an unreacted monomer. Therefore, change of properties due to heat history does not occur during the molding process, and moreover, the thermoplastic elastomer composition is excellent in fluidity.

The thermoplastic elastomer composition of the present invention can further contain hitherto known additives, such as heat stabilizer, weathering stabilizer, anti-aging agent, antistatic agent, filler and colorant, within limits not detrimental to the object of the present invention.

The thermoplastic elastomer composition of the present invention is obtained by kneading the above components to (A) to (D) by the use of the aforesaid batch mixer and thereby carrying out dynamic crosslinking. This dynamic crosslinking is carried out under the conditions satisfying the aforesaid requirements (1) to (4).

The kneading temperature is usually 125 to 280° C., preferably 145 to 240° C. The kneading time, as measured from the time when the crosslinking agent (D) has been introduced, is usually 1 to 30 minutes, preferably 1 to 20 minutes. In this kneading, it is preferable to add an antioxidant. The shear force applied in the kneading process is usually in the range of 1 to $10^4$ $sec^{-1}$, preferably 10 to $10^4$ $sec^{-1}$, in terms of shear rate.

As previously described, prior to the introduction of the crosslinking agent (D), the softener (C) and the ethylene/α-olefin/non-conjugated polyene copolymer (IQ have been kneaded with each other. Here, the softener (C) may have been kneaded in advance into the ethylene/α-olefin/non-conjugated polyene copolymer (A). Further, an ethylene/α-olefin/non-conjugated polyene copolymer (A') wherein the softener (C) has been kneaded into the ethylene/α-olefin/non-conjugated polyene copolymer (A) may be used in combination.

The thermoplastic elastomer composition of the present invention is a composition in which the ethylene/α-olefin/non-conjugated polyene copolymer (A) is microdispersed as an island phase in a sea phase composed of the polyolefin resin (B). When dynamic crosslinking is carried out using a batch mixer under the conditions satisfying the aforesaid requirements (1) to (4), it is possible to sufficiently carry out dispersing of the island phase, as previously described, and therefore, the thermoplastic elastomer composition of the present invention suffers little occurrence of a gel-like substance, has good appearance and has excellent mechanical properties. Further the extruder output can be increased.

In the present invention, use of a batch mixer makes it possible to accurately control various kneading parameters shown in the aforesaid requirements (1) to (3). Moreover, by carrying out crosslinking after the composition temperature is lowered by the introduction of the softener, a composition in which the island phase has been microdispersed better than that in the conventional products is obtained. Since this composition has higher viscosity than the conventional products, the appearance of a molded product is excellent, and the extruder output is increased.

In the thermoplastic elastomer composition of the present invention, it is preferable that the average particle diameter do of circle equivalents of the island phase, as obtained by image analysis of a photomicrograph observed with an electron microscope (EM), is not more than 5 µm and the particle size distribution dv/dn of the island phase (dv: volume average particle diameter of circle equivalents of the island phase) is not more than 1.5. dn is preferably not more than 4 µm, more preferably not more than 2 µm. dn in this range is preferable from the viewpoint of improvement in rubber elasticity. The particle size distribution dv/dn of the rubber island phase is preferably not more than 1.45, more preferably not more than 1.4. dv/dn in this range is preferable from the viewpoint of improvement in rubber elasticity.

From the thermoplastic elastomer composition of the present invention, molded products can be produced by well-known molding methods, e.g., various molding methods, such as extrusion molding, press molding, injection molding, calendering and blow molding. Molded products are used for automotive parts, industrial machine parts, electrical and electronic parts, civil engineering and construction parts, medical parts, etc., and can be utilized for materials requiring flexibility, mechanical strength, shape recovery properties, impact resilience, etc., and in particular, they can be utilized for skin materials.

The thermoplastic elastomer produced by the production process of the present invention can be processed into a foam body by the use of a known foaming method.

EXAMPLES

In the following examples and comparative examples, measurement of properties of the thermoplastic elastomer composition and evaluation of appearance of the molded product were carried out by the following methods.

[Property Measurement]
[Melt Flow Rate (MFR)]

Melt flow rate was measured at 230° C. under a load of 10 kg in accordance with ASTM D1238.

[Tensile Strength (TB), Elongation (EB)]

The thermoplastic elastomer composition was subjected to press molding at 210° C. to prepare a pressed sheet having a length of 200 mm, a width of 200 mm an a thickness of 2 mm, and a dumbbell (JIS No. 3) specimen was prepared by punching it from this pressed sheet. Using this specimen, a tensile strength (TB) and an elongation (EB) were measured at a pulling rate of 500 mm/min in accordance with JIS K6251 (2010).

[Compression Set (CS)]

A press-molded sheet prepared from the thermoplastic elastomer composition by the use of a press-molding machine was compressed by 25% using a spacer in accordance with JIS K6262 and subjected to heat treatment at 70° C. for 24 hours. After the treatment, the sheet was allowed to stand for 30 minutes in a constant temperature room at 23° C. Thereafter, the thickness of the sheet was measured, and a compression set (CS) was determined by the following formula.

$$CS=[(t0-t1)/(t0-t2)]\times 100$$

CS: compression set (%)
t0: original thickness (mm) of the press-molded sheet
t1: thickness (mm) of the press-molded sheet after allowed to stand for 30 minutes
t2: thickness (mm) of the press-molded sheet under application of compression strain

[ΔMelt Density]

Melt density of the thermoplastic elastomer composition was measured at 200° C. in accordance with JIS K6262, and using a density at 23° C., the Δmelt density (200° C.) was calculated from the following formula.

$$\Delta\text{Melt density (200° C.) (\%)}=(\text{melt density (200° C.)}/\text{density (23° C.)})\times 100 \quad [\text{Math. 10}]$$

[Extruder Output]

The thermoplastic elastomer composition was fed to a single screw extruder equipped with a die of 25 mm×1 mm at the opening and having a full-flighted screw having a screw diameter of 50 mm, of 31 and a compression ratio of 3.1, and the thermoplastic elastomer was extruded for 36 seconds while the temperature of the region from the introductory part of the extrudes to the die exit was set at 160° C. to 200° C. From the weight of the composition extruded, an extruder output per hour was calculated.

[Appearance Evaluation of Molded Product]

The number of protrusions with a diameter of not less than 0.8 ram observed on a surface of a molded product of a flat belt extruded from the extruder in the above extruder output test was measured per in of a length of the molded product, and the appearance of the molded product was evaluated by the number of the protrusions.

Example 1

Into an intermeshing mixer (manufactured by harburg-Freudenberger Maschinenbau GmbH, INTERMIX (registered trademark) GK45E), 78 parts by mass of an ethylene/α-olefin/non-conjugated polyene copolymer rubber (EPDM) (trade name: MITSUI EPT 3072EPM (manufactured by Mitsui Chemicals, Inc.), 22 parts by mass of a crystalline polyolefin-based resin (PP-1) (trade name: EL-Pro P740J (manufactured by SCG Chemicals) and 15 parts by mass of a crystalline polyolefin-based resin (PP-2) (trade name: Polypropylene Resin P241 (Prime Polymer Co., Ltd.) were introduced, and while kneading, the temperature was raised up to 175° C. from room temperature to prepare a resin/rubber composition.

Subsequently, 0.2 part by mass of a phenol-based antioxidant (trade name: Irganox 1010 (manufactured by BASF)) and 32 parts by mass of a softener (trade name: Diana Process Oil PW-100 (manufactured by Idemitsu Kosan Co., Ltd.)) were introduced into the intermeshing mixer, and while kneading, the temperature was lowered down to 135° C.

Thereafter, 0.40 part by mass of an organic peroxide-based crosslinking agent. (trade name: PERHEXA 25B (manufactured by NOF Corporation)) and 0.16 part by mass of a divinylbenzene-based crosslinking assistant (trade name: DVB-810 (manufactured by NS Styrene Monomer Co., Ltd.)) were introduced into the intermeshing mixer and kneaded to obtain a thermoplastic elastomer composition.

After the introduction of the crosslinking agent, rotational speed, kneading time and kneading temperature pattern were determined so that P1 in the requirement (1) might become 104.9 and the resin temperature might become 162° C., and crosslinking reaction was carried out to obtain a thermoplastic elastomer composition. The kneading time (residence time) after the introduction of the crosslinking agent was 540 seconds, P2 in the requirement (2) was 1189, and P3 in the requirement (3) was −1.1.

In the above operations, the capacity of the intermeshing mixer was 49 liters, and the charge weight per batch was 36 kg (filling ratio: 85%).

The results of the property measurement of the resulting thermoplastic elastomer composition and the evaluation of appearance of the molded product are set forth in Table 1.

Example 2

A thermoplastic elastomer composition was obtained under the same conditions as in Example 1, except that PERHEXYNE 25B (trade name, manufactured by NOF Corporation) was used instead of PERHEXA 25B as the organic peroxide-based crosslinking agent. In this case, P3 was −1.6.

Comparative Example 1

A resin/rubber composition was prepared in the same manner as in Example 1.

Subsequently, 0.2 part by mass of a phenol-based antioxidant (trade name: Irganox 1010 (manufactured by BASE)) was introduced into the intermeshing mixer, and while kneading, the temperature was lowered down to 135° C.

Thereafter, 0.40 part by mass of an organic peroxide-based crosslinking agent (trade name: PERHEXA 25B (manufactured by NOF Corporation)) and 0.16 part by mass of a divinylbenzene-based crosslinking assistant (trade name: DVB-810 (manufactured by NS Styrene Monomer Co., Ltd.)) were introduced into the intermeshing mixer and kneaded.

Thereafter, 32 parts by mass of a softener (trade name: Diana Process Oil PW-100 (manufactured by Idemitsu Kosan Co., Ltd.)) were introduced into the intermeshing mixer and kneaded to obtain a thermoplastic elastomer composition.

After the introduction of the crosslinking agent, rotational speed, kneading time and kneading temperature pattern were determined so that P1 in the requirement (1) might become 106.3 and the average resin temperature might become 161° C., and crosslinking reaction was carried out to obtain a thermoplastic elastomer composition. The kneading time (residence time) after the introduction of the crosslinking agent was 555 seconds, P2 is the requirement (2) was 1191, and P3 in the requirement (3) was −1.1.

In the above operations, the capacity of the intermeshing mixer was 49 liters, and the charge weight per batch was 36 kg (filling ratio: 95%).

The results of the property measurement of the resulting thermoplastic elastomer composition and the evaluation of appearance of the molded product are set forth in Table 1.

Comparative Examples 2 to 7

Thermoplastic elastomers were obtained in the same formulation and conditions as in Example 1, except that the kneading conditions were changed so that the parameters P1, P2 and P3 might become the numerical values shown in Table 1.

The results of the property measurement of the resulting thermoplastic elastomer compositions and the evaluation of appearance of the molded products are set forth in Table 1.

TABLE 1

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Timing for introduction of softener (C) (based on introduction of crosslinking agent) | before | before | after | before | before | before | before | before | before |
| Crosslinking agent | PERHEXA | PERHEXYNE | PERHEXA | PERHEXA | PERHEXA | PERHEXA | PERHEXA | PERHEXA | PERHEXA |
| P1 | 104.9 | 105.4 | 106.3 | 105.3 | 107.7 | 308.6 | 104.7 | 103.5 | 41.1 |
| P2 | 1189 | 1195 | 1191 | 1408 | 1503 | 1266 | 1003 | 875 | 1249 |
| P3 | −1.1 | −1.6 | −1.1 | 1.7 | 1.4 | 0.2 | −2.8 | −2.0 | −0.9 |
| Average resin temperature Tave (° C.) | 162 | 163 | 161 | 238 | 220 | 195 | 128 | 155 | 162 |
| Kneading time t1 (sec) after introduction of crosslinking agent | 540 | 549 | 555 | 570 | 1110 | 510 | 316 | 111 | 740 |
| TB (MPa) | 4.8 | 5.1 | 4.7 | 4.0 | 4.0 | 4.1 | 4.4 | 4.4 | 4.9 |
| EB (%) | 500 | 520 | 500 | 380 | 400 | 390 | 480 | 470 | 510 |
| CS (%) | 42 | 39 | 41 | 40 | 40 | 41 | 56 | 53 | 39 |
| MFR | 31 | 33 | 79 | 82 | 81 | 78 | 28 | 21 | 20 |
| ΔMelt density (%) | 90.2 | 90.2 | 86.8 | 90.2 | 90.2 | 90.2 | 90.2 | 90.2 | 90.2 |
| Extruder output (kg/h) | 13.1 | 13.2 | 11.5 | 13 | 13.1 | 13.1 | 13 | 13.3 | 12.8 |
| Appearance of molded product (number of protrusions) | 29 | 24 | 37 | 110 | 38 | 28 | 35 | 98 | 120 |

The invention claimed is:

1. A production process for a thermoplastic elastomer composition, comprising dynamically crosslinking
   an ethylene/α-olefin/non-conjugated polyene copolymer (A),
   a polyolefin resin (B),
   a softener (C) in an amount of 1 to 200 parts by mass per 100 parts by mass of the total of the copolymer (A) and the resin (B), and
   a crosslinking agent (D),
   by the use of a batch mixer under the conditions satisfying the following requirements (1) to (4):

$$50 \leq P1 \leq 300 \quad (1)$$

wherein P1 is defined by the following formula (i):

[Math. 1]

$$P1 = \gamma\text{ave.} \times \text{Log}(t1) \quad (i)$$

wherein the residence time (sec) after the introduction of the crosslinking agent (D) is denoted as t1 sec, and the average rate (sec$^{-1}$) of shear rates γ in the t1 is denoted as γave. sec$^{-1}$, $$900 \leq P2 \leq 1450 \quad (2)$$

wherein P2 is defined by the following formula (ii):

[Math. 2]

$$P2 = (T\text{ave.} + 273) \times \text{Log}(t1) \quad (ii)$$

wherein the average resin temperature (° C.) after the introduction of the crosslinking agent (D) is denoted as Tave. ° C., and the residence time (sec) after the introduction of the crosslinking agent (D) is denoted as t1 sec, $$-2.5 \leq P3 \leq 1.5 \quad (3)$$

wherein P3 is defined by the following formula (iii):

[Math. 3]

$$P3 = \text{Log}(t1/t2) \quad (iii)$$

wherein the residence time (sec) after the introduction of the crosslinking agent (D) is denoted as t1 sec, and the time (sec) required for the residual amount of the crosslinking agent (D) to become not more than 1 ppm of the introduction amount thereof at the average resin temperature Tave. after the introduction of the crosslinking agent (D) is denoted as t2 sec, and (4) the crosslinking agent (D) is introduced into the batch mixer after the ethylene/α-olefin/non-conjugated polyene copolymer (A), the polyolefin resin (B) and the softener (C) have been introduced.

2. The production process for a thermoplastic elastomer composition as claimed in claim 1, wherein the mass ratio ((A)/(B)) of the ethylene/α-olefin/non-conjugated polyene copolymer (A) to the polyolefin resin (B) is 90/10 to 10/90.

3. The production process for a thermoplastic elastomer composition as claimed in claim 1, wherein the crosslinking agent (D) is an organic peroxide, and the amount of the crosslinking agent (D) compounded is 0.01 to 3.0 parts by mass per 100 parts by mass of the total of the copolymer (A) and the resin (B).

4. The production process for a thermoplastic elastomer composition as claimed claim 1, wherein the batch mixer is an intermeshing mixer.

* * * * *